(12) United States Patent
Suzuki et al.

(10) Patent No.: US 10,708,097 B2
(45) Date of Patent: Jul. 7, 2020

(54) TERMINAL APPARATUS, BASE STATION APPARATUS, COMMUNICATION METHOD, AND INTEGRATED CIRCUIT

(71) Applicant: SHARP KABUSHIKI KAISHA, Sakai, Osaka (JP)

(72) Inventors: Shoichi Suzuki, Sakai (JP); Shohei Yamada, Sakai (JP); Kazunari Yokomakura, Sakai (JP); Hiroki Takahashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/083,156

(22) PCT Filed: Jan. 20, 2017

(86) PCT No.: PCT/JP2017/001969
§ 371 (c)(1),
(2) Date: Sep. 7, 2018

(87) PCT Pub. No.: WO2017/154379
PCT Pub. Date: Sep. 14, 2017

(65) Prior Publication Data
US 2019/0097853 A1 Mar. 28, 2019

(30) Foreign Application Priority Data
Mar. 10, 2016 (JP) .................. 2016-046647

(51) Int. Cl.
*H04L 27/26* (2006.01)
*H04L 27/34* (2006.01)

(52) U.S. Cl.
CPC .......... *H04L 27/2602* (2013.01); *H04L 27/26* (2013.01); *H04L 27/2634* (2013.01); *H04L 27/3444* (2013.01)

(58) Field of Classification Search
CPC . H04L 27/26; H04L 27/2602; H04L 27/2634; H04L 27/3444
See application file for complete search history.

(56) References Cited

U.S. PATENT DOCUMENTS

| | | | |
|---|---|---|---|
| 2008/0080628 A1* | 4/2008 | To ..................... | H04B 7/061 375/260 |
| 2012/0063530 A1 | 3/2012 | Nakajima | |
| 2016/0277224 A1* | 9/2016 | Liu ..................... | H04L 27/20 |
| 2016/0286012 A1* | 9/2016 | Yu ...................... | H04L 69/321 |

(Continued)

FOREIGN PATENT DOCUMENTS

WO 2010/143720 A1 12/2010

OTHER PUBLICATIONS

Ericsson, "NB-PUSCH Resource Allocation", R1-161033, 3GPP TSG-RAN1#84, Feb. 15-19, 2016, St Julian's, Malta.

(Continued)

*Primary Examiner* — Gary Mui
(74) *Attorney, Agent, or Firm* — ScienBiziP, P.C.

(57) ABSTRACT

A terminal apparatus configured to transmit a time continuous signal for a first subcarrier in a first time symbol, and to generate the time continuous signal based on at least a first complex-valued symbol to which a phase rotation is applied. The phase rotation is given based on at least a subcarrier index of the first subcarrier.

7 Claims, 14 Drawing Sheets

(56) References Cited

U.S. PATENT DOCUMENTS

| | | | |
|---|---|---|---|
| 2017/0201403 A1* | 7/2017 | Johansson | H04B 7/0639 |
| 2018/0062904 A1* | 3/2018 | Hwang | H04L 1/08 |
| 2018/0213468 A1* | 7/2018 | Chatterjee | H04L 5/0053 |

OTHER PUBLICATIONS

Ericsson, "Introduction of NB-IoT", R1-161562, 3GPP TSG-RAN WG1 Meeting #84, Feb. 15-19, 2016, St Julian's, Malta.

Huawei, HI Silicon, "Revised Work Item: Narrowband IoT (NB-IoT)", RP-152284, 3GPP TSG RAN Meeting #70, Sitges, Spain, Dec. 7-10, 2015.

Pudney, Chris et al., "NarrowBand IOT", RP-151931, 3GPP TSG RAN meeting #70, Sitges, Spain, Dec. 7-10, 2015.

"LTE; Evolved Universal Terrestrial Radio Access (E-UTRA); Radio Resource Control (RRC); Protocol specification", 3GPP TS 36.331 V13.0.0 Release 13, (Dec. 2015), Jan. 17, 2016.

"LTE; Evolved Universal Terrestrial Radio Access (E-UTRA); Medium Access Control (MAC) Protocol specification", 3GPP TS 36.321 V13.0.0 (Dec. 2015), Jan. 14, 2016.

"LTE; Evolved Universal Terrestrial Radio Access (E-UTRA); Physical layer procedures", 3GPP TS 36.213 V13.0.0 (Dec. 2015), Jan. 6, 2016.

"LTE; Evolved Universal Terrestrial Radio Access (E-UTRA); Multiplexing and channel coding", 3GPP TS 36.212 V13.0.0 (Dec. 2015), Jan. 6, 2016.

"LTE; Evolved Universal Terrestrial Radio Access (E-UTRA); Physical channels and modulation", 3GPP TS 36.211 V13.0.0 (Dec. 2015), Jan. 6, 2016.

Neul et al., "PAPR reduction for single-tone PUSCH transmissions", R1-160100, 3GPP TSG RAN WG1 NB-IoT Ad-Hoc Meeting Jan. 18-20, 2016.

Huawei et al., "NB-PUSCH design", R1-160325, 3GPP TSG RAN WG1 Meeting #84 Feb. 15-19, 2016.

\* cited by examiner

TERMINAL APPARATUS, BASE STATION APPARATUS, COMMUNICATION METHOD, AND INTEGRATED CIRCUIT

TECHNICAL FIELD

An embodiment of the present invention relates to a terminal apparatus, a base station apparatus, a communication method, and an integrated circuit.

BACKGROUND ART

The 3rd Generation Partnership Project (3GPP) has been working to standardize a radio access method and a radio network for cellular mobile communications (hereinafter, referred to as "Long Term Evolution (LTE)", or "Evolved Universal Terrestrial Radio Access (EUTRA)") (NPLs 1, 2, and 3). In LTE, a base station apparatus is also referred to as an evolved NodeB (eNodeB), and a terminal apparatus is also referred to as a User Equipment (UE). LTE is a cellular communication system in which multiple areas each covered by the base station apparatus are deployed in a cellular structure. A single base station apparatus may manage multiple cells.

3GPP has been working to standardize Narrow Band-Internet of Things (NB-IoT) for reducing costs of terminal apparatuses and reducing power consumption of terminal apparatuses. (NPL 6). For the NB-IoT uplink, transmission using one tone is supported (NPL 7).

CITATION LIST

Non Patent Literature

NPL 1: "3GPPTS 36.211 V13.0.0 (2015-12)", Jan. 6, 2016.
NPL 2: "3GPPTS 36.212 V13.0.0 (2015-12)", Jan. 6, 2016
NPL 3: "3GPPTS 36.213 V13.0.0 (2015-12)", Jan. 6, 2016.
NPL4: "3GPPTS 36.321 V13.0.0 (2015-12)", Jan. 14, 2016.
NPL 5: "3GPPTS 36.331 V13.0.0 (2015-12)", Jan. 7, 2016.
NPL 6: "Status Report for WI: NarrowBand IOT", RP-151931, Vodafone, Huawei. Ericsson. Qualconim, 3GPP TSG RAN Meeting #70, Silges. Spain. 7-10 Dec. 2015.
NPL 7: "Revised Work Item: Narrowband IoT (NB-IoT)", RP-152284, Huawei, HiSilicon, 3GPPTSG RAN Meeting #70, Silges, Spain, 7-10 Dec. 2015.

SUMMARY OF INVENTION

Technical Problem

An embodiment of the present invention provides a terminal apparatus capable of efficiently communicating with a base station apparatus, a base station apparatus communicating with the terminal apparatus, a communication method used for the terminal apparatus, a communication method used for the base station apparatus, an integrated circuit implemented on the terminal apparatus, and an integrated circuit implemented on the base station apparatus. For example, the communication methods used for the terminal apparatus and the base station apparatus may include an uplink transmission method, a modulation method, and/or a coding method for reducing interference between cells and/or between terminal apparatuses.

Solution to Problem (1) According to some aspects of the present invention, the following measures are provided. That is, a first aspect of the present invention is a terminal apparatus including a transmitter configured to transmit a time continuous signal for a first subcarrier in a first time symbol, and a baseband unit configured to generate the time continuous signal based on at least a first complex-valued symbol to which a phase rotation is applied. The phase rotation is given based on at least a subcarrier index of the first subcarrier.

(2) A second aspect of the present invention is a base station apparatus including a receiver configured to receive a time continuous signal for a first subcarrier in a first time symbol from a terminal apparatus, and a decoder configured to detect a first complex-valued symbol from the time continuous signal. The time continuous signal is generated, by the terminal apparatus, based on at least the first complex-valued symbol to which a phase rotation is applied, and the phase rotation is given based on at least a subcarrier index of the first subcarrier.

(3) A third aspect of the present invention is a communication method used for a terminal apparatus, the method including transmitting a time continuous signal for a first subcarrier in a first time symbol, and generating the time continuous signal based on at least a first complex-valued symbol to which a phase rotation is applied. The phase rotation is given based on at least a subcarrier index of the first subcarrier.

(4) A fourth aspect of the present invention is a communication method used for a base station apparatus, the method including receiving a time continuous signal for a first subcarrier in a first time symbol from a terminal apparatus, and detecting a first complex-valued symbol from the time continuous signal. The time continuous signal is generated, by the terminal apparatus, based on at least the first complex-valued symbol to which a phase rotation is applied, and the phase rotation is given based on at least a subcarrier index of the first subcarrier.

Advantageous Effects of Invention

According to the present invention, a terminal apparatus and a base station apparatus can efficiently communicate with each other.

DESCRIPTION OF EMBODIMENTS

Embodiments of the present invention will be described below.

Long Term Evolution (LTE) (trade name) and Narrow Band Internet of Things (NB-IoT) may be defined as different Radio Access Technologies (RAT). NB-IoT may be defined as a technology included in LTE. The present embodiment is applied to NB-IoT, but may also be applied to LTE or other RATs.

Figure 1:
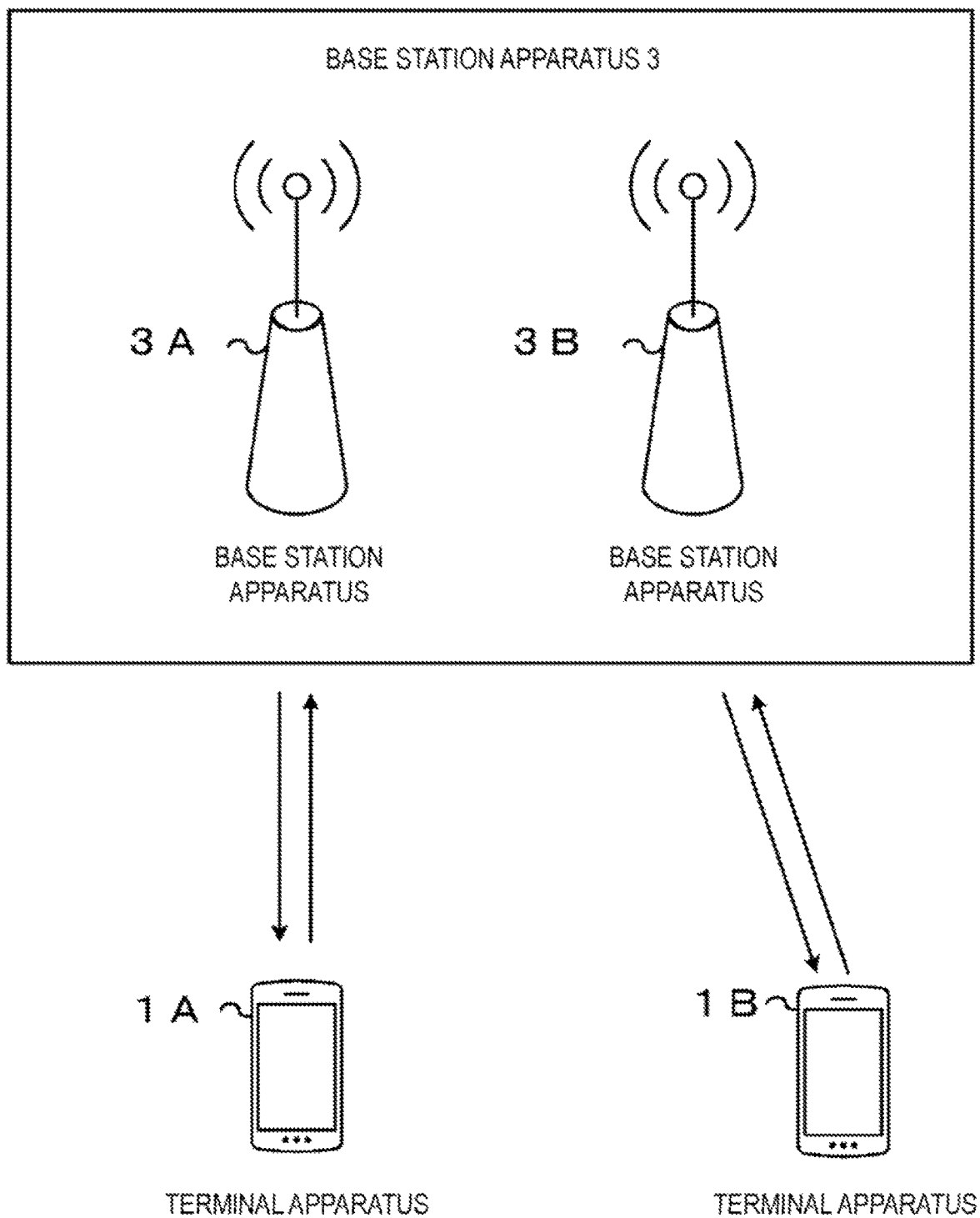
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 1A, a terminal apparatus 1B, a base station apparatus 3A, and a base station apparatus 3B. The terminal apparatus 1A and the terminal apparatus 1B are also referred to as a terminal apparatus 1. A base station apparatus 3 includes the base station apparatus 3A and the base station apparatus 3B. The base station apparatus 3A and the base station apparatus 3B may be defined as separate apparatuses. The base station apparatus 3 may include a core network apparatus.

The terminal apparatus 1A and the base station apparatus 3A communicate with each other by using NB-IoT. The terminal apparatus 1B and the base station apparatus 3B communicate with each other by using NB-IoT.

Time Division Duplex (TDD) and/or Frequency Division Duplex (FDD) is applied to a radio communication system in the present embodiment. In the present embodiment one serving cell is configured for the terminal apparatus 1. The serving cell configured for the terminal apparatus 1 is also referred to as an NB-IoT cell.

The configured one serving cell may be one primary cell. The primary cell is a serving cell in which an initial connection establishment procedure has been performed, a serving cell in which a connection re-establishment procedure has been started, or a cell indicated as a primary cell during a handover procedure.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The present embodiment may be applied to three scenarios/modes, i.e., standalone, guard band, and in-band scenarios/modes. In the standalone mode, a channel bandwidth of the NB-IoT cell is not included in a channel bandwidth of an LTE cell, in the guard band mode, the channel bandwidth of the NB-IoT cell is included in a guard band of the LTE cell. In the in-band mode, the channel bandwidth of the NB-IoT cell is included in a transmission bandwidth of the LTE cell. For example, the guard band of the LIE cell is a band included in the channel bandwidth of the LTE cell but not included in the transmission bandwidth of the LTE cell. The present embodiment may be applied to any of these modes.

Figure 2:
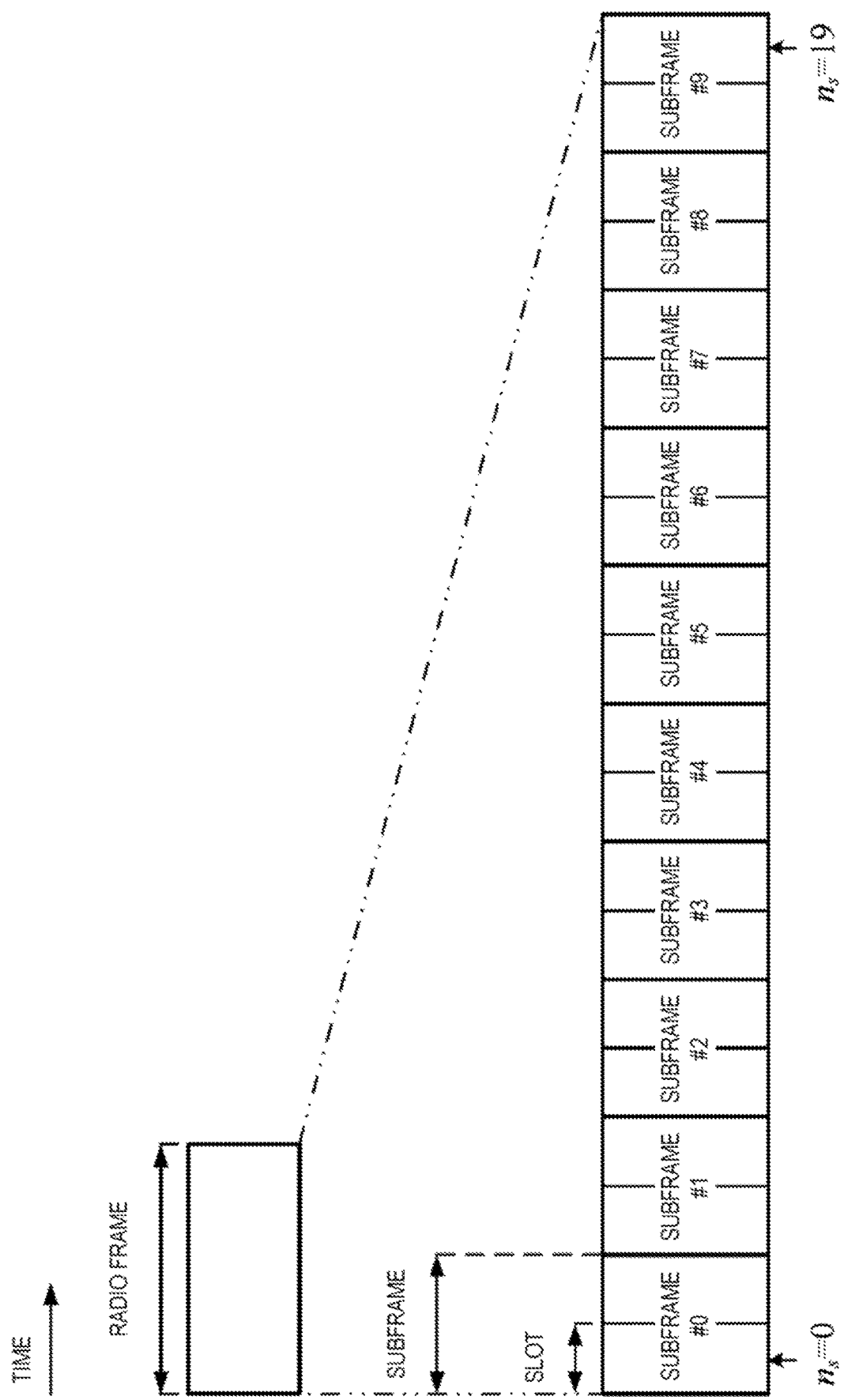
FIG. 2 is a diagram illustrating an example of a structure of a radio frame according to the present embodiment.

FIG. 2 is a diagram illustrating an example of a structure of a radio frame according to the present embodiment. In FIG. 2, the horizontal axis is a time axis.

Each of the radio frames may include ten contiguous subframes in the time domain. Each of subframes i may include two contiguous slots in the time domain. The two contiguous slots in the time domain may be a slot having a slot number $n_S$ of 2i in the radio frame and a slot having a slot number $n_S$ of 2i+1 in the radio frame. Each of the radio frames may include ten contiguous subframes in the time domain. Each of the radio frames may include 20 contiguous slots ($n_S$=0, 1, . . . , 19) in the time domain.

Figure 3:
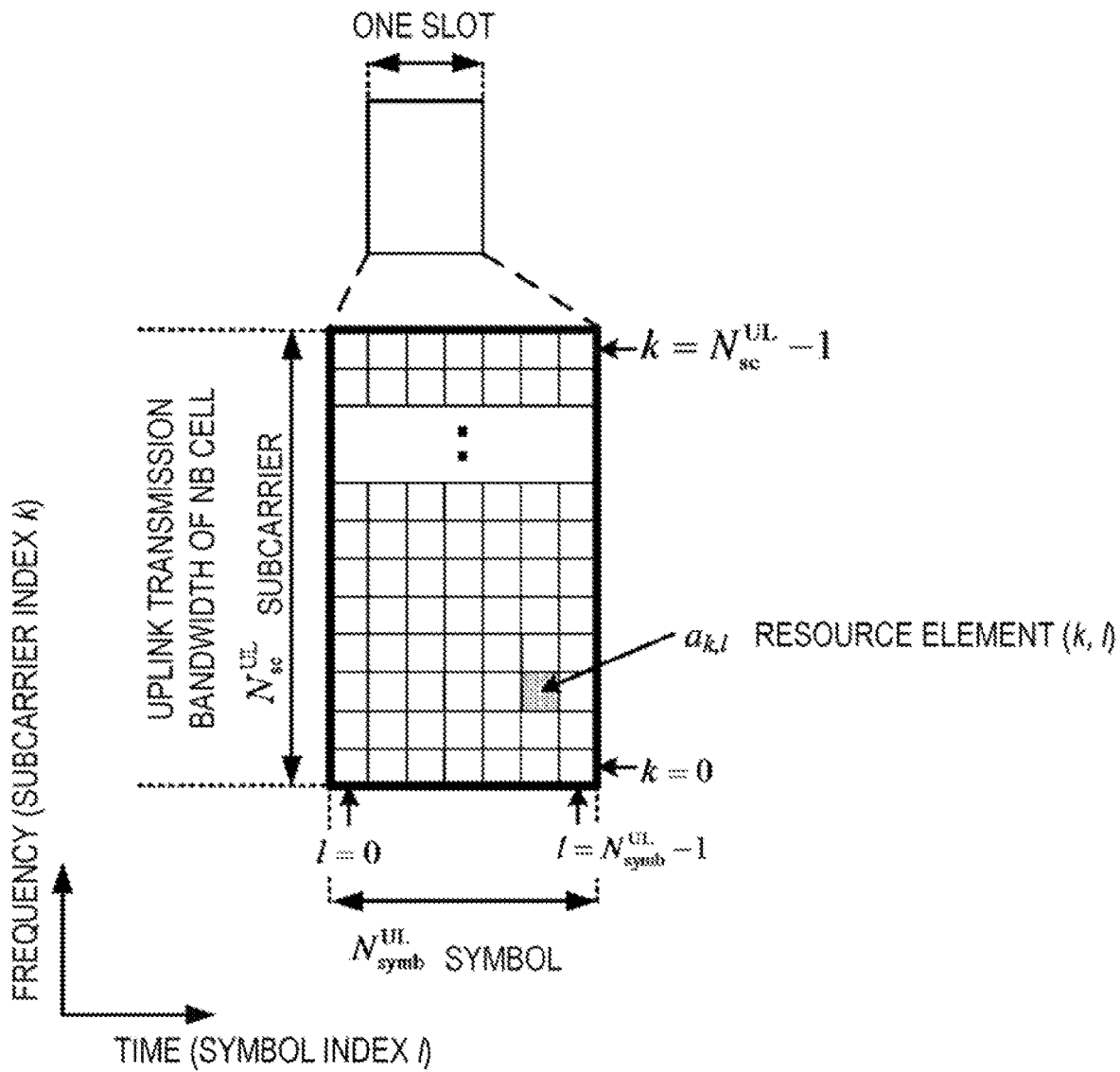
FIG. 3 is a diagram illustrating a schematic configuration of an uplink slot according to the present embodiment.

A configuration of a slot according to the present embodiment will be described below. FIG. 3 is a diagram illustrating a schematic configuration of an uplink slot according to the present embodiment. FIG. 3 illustrates a configuration of an uplink slot in one NB-IoT cell. In FIG. 3, the horizontal axis is a time axis, and the vertical axis is a frequency axis, in FIG. 3, l is a symbol number/index, and k is a subcarrier number/index. A subcarrier is also referred to as a tone.

The physical signal or the physical channel transmitted in each of the slots is expressed by a resource grid. In the uplink, the resource grid is defined by multiple subcarriers and multiple time symbols. Each element within the resource grid is referred to as a resource element. The resource element $a_{k,l}$ is expressed by a subcarrier number/index k and a symbol number/index l.

The resource grid is defined for each antenna port. In the present embodiment, description is given for one antenna port. The present embodiment may be applied to each of multiple antenna ports.

The uplink slot includes multiple symbols l (l=0, 1, . . . , and $N^{UL}_{symb}$−1) in the time domain, $N^{UL}_{symb}$ indicates the number of OFDM symbols included in one uplink slot. For a normal Cyclic Prefix (CP), $N^{UL}_{symb}$ may be 7. For an extended Cyclic Prefix (CP), $N^{UL}_{symb}$ may be 6.

In NB-IoT uplink, a transmission bandwidth configuration (system bandwidth) is 180 kHz. The uplink slot includes multiple subcarriers k (k=0, 1, . . . , $N^{UL}_{SC}$) in a frequency domain. $N^{UL}_{SC}$ is the number of subcarriers in a frequency domain for NB-IoT. In the uplink, a subcarrier interval Δf is 15 kHz or 3.75 kHz. In a case that the uplink subcarrier interval Δf is 15 kHz, $N^{RB}_{sc}$ is 12 subcarriers. In a case that the uplink subcarrier interval Δf is 3.75 kHz, $N^{RB}_{sc}$ is 48 subcarriers.

Figure 4:
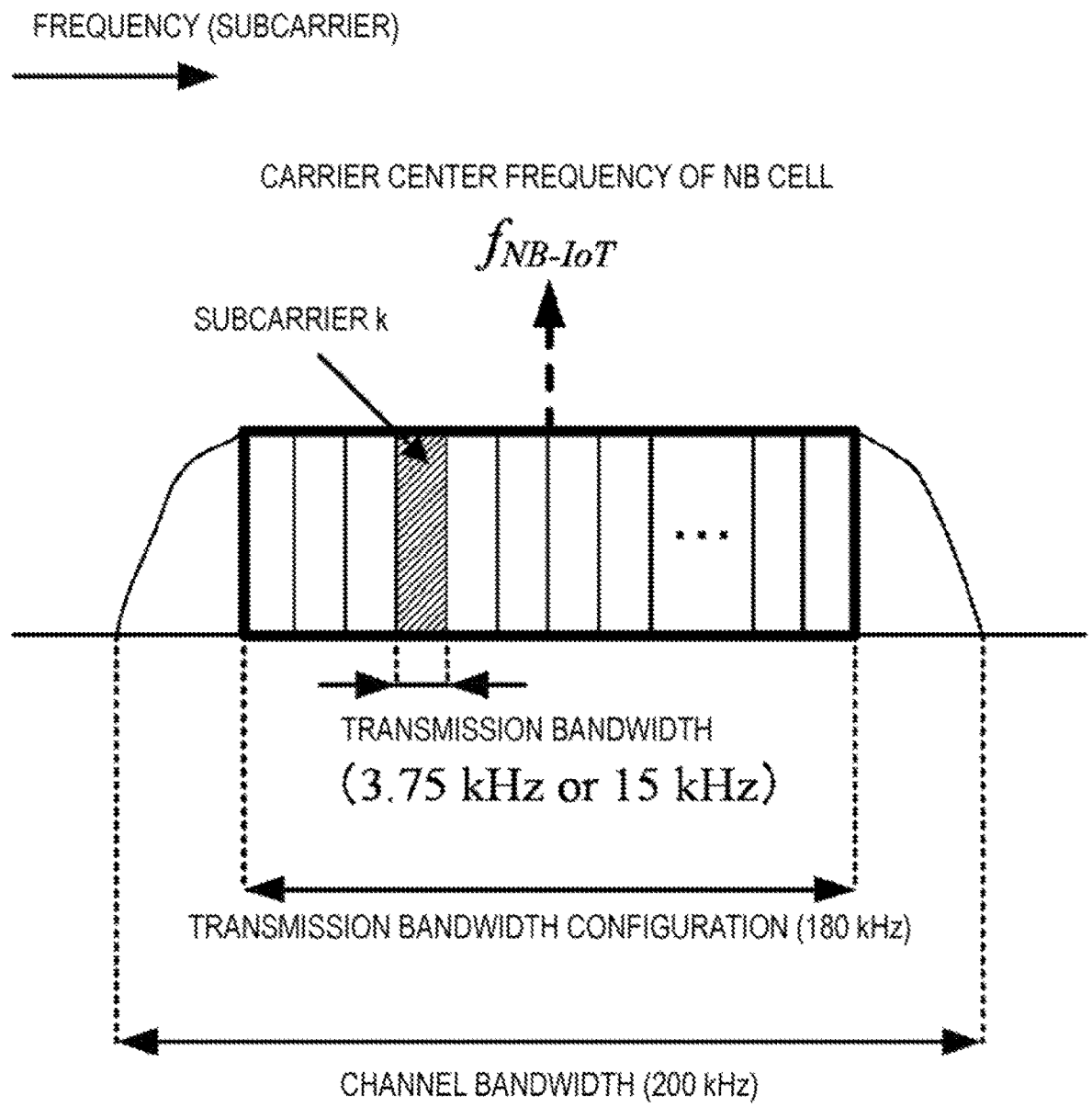
FIG. 4 is a diagram illustrating an example of a channel bandwidth configuration of an NB-IoT cell according to the present embodiment.

FIG. 4 is a diagram illustrating an example of a channel bandwidth configuration of an NB-IoT cell according to the present embodiment. In FIG. 4, the horizontal axis is a frequency axis. The transmission bandwidth configuration of the NB-IoT cell is 180 kHz, and the channel bandwidth of the NB-IoT cell is 200 kHz. The terminal apparatus 1 transmits an uplink signal in one symbol l by using one subcarrier k. The band used by the terminal apparatus 1 for uplink signal transmission is referred to as a transmission bandwidth.

Physical channels and physical signals in the present embodiment will be described.

In FIG. 1, the following downlink physical channels are used for downlink radio communication from the base station apparatus 3 to the terminal apparatus 1. The downlink physical channels are used by the physical layer for transmission of information output from the higher layer.

Narrowband Physical Broadcast Channel (NPBCH)

Narrowband Physical Downlink Control Channel (NPDCCH)

Narrowband Physical Downlink Shared Channel (NPDSCH)

The NPBCH is used to broadcast system information commonly used by the terminal apparatuses 1.

The NPDCCH is used to transmit downlink control information (Narrow Band Downlink Control information (DCI)) used to schedule the NPDSCH, and downlink control information used to schedule a Narrow Band Physical Uplink Shared Channel (NPUSCH). The downlink control information may include HARQ information.

Cyclic Redundancy Check (CRC) parity bits attached to the downlink control information are scrambled with a Cell Radio Network Temporary identifier (C-RNTI) or a Semi Persistent Scheduling (SPS) Cell-Radio Network Temporary Identifier (C-RNTI). The C-RNTI and the SPS C-RNTI are identifiers for identifying a terminal apparatus within a cell. The Temporary C-RNTI is used during a contention based random access procedure. An RNTI attached to the downlink control information is also referred to as the RNTI included in the NPDCCH.

The C-RNTI is used to control the NPDSCH or the NPUSCH in one subframe. The SPS C-RNTI is used to periodically allocate a resource for the NPDSCH or the NPUSCH. The Temporary C-RNTI is used to schedule re-transmission of a random access message 3 and transmission of a random access message 4.

The NPDSCH is used to transmit downlink data (Downlink Shared Channel (DL-SCH)).

In FIG. 1, the following downlink physical signals are used for downlink radio communication from the base station apparatus 3 to the terminal apparatus 1. The downlink physical signals are not used for transmission of information output from the higher layer, but are used by the physical layer.

Narrowband Synchronization Signal (NSS)

Narrowband Downlink Reference Signal (NDL RS)

The NSS is used for the terminal apparatus 1 to acquire frequency and time synchronization in the downlink of an NB-IoT cell. The NSS includes a Narrowband Primary Synchronization Signal (NPSS) and a Narrowband Secondary Synchronization Signal (NSSS). The NSSS is generated based on a Narrowband Physical layer Cell. Identity (NPCI) of the NB-IoT cell. The terminal apparatus 1 may acquire the NPCI of the NB-IoT cell from the NSS.

The NDL RS may be used for the terminal apparatus 1 to perform channel compensation on a downlink physical channel of the NB-IoT cell. The NDL RS may be used for the terminal apparatus 1 to calculate downlink channel state information of the NB-IoT cell.

In FIG. 1, the following uplink physical channels are used for uplink radio communication from the base station apparatus 3 to the terminal apparatus 1. The uplink physical channels are used by a physical layer for transmission of information output from a higher layer.

Narrowband Physical Random Access Channel (NPRACH)

Narrowband Physical Uplink Shared Channel (NPUSCH)

The NPUSCH may be used for transmission of uplink data (UpLink-Shared CHannel (UL-SCH)) and/or uplink control information. The uplink control information includes Hybrid Automatic Repeat reQuest ACKnowledgment (HARQ-ACK) corresponding to the NPDSCH (downlink data). In the present embodiment, one NPUSCH transmission corresponds to one subcarrier. A different NPUSCH transmission may correspond to a different subcarrier.

In FIG. 1, the following uplink physical signal is used for uplink radio communication from the base station apparatus 3 to the terminal apparatus 1. The uplink physical signal is not used for transmission of information output from the higher layer, but is used by the physical layer.

Narrowband Uplink Reference Signal (NUL RS)

The NUL RS may be used for the base station apparatus 1 to perform channel compensation on an uplink physical channel of an NB-IoT cell. The NUL RS may be used for the terminal apparatus 1 to calculate uplink channel state information of the NB-IoT cell. The NUL RS may be mapped to the same subcarrier as the corresponding NPUSCH. The NUL-RS may be time-multiplexed with the NPUSCH.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The DL-SCH is a transport channel. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer, in the physical layer, the transport block is mapped to a codeword and coding processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive, in a Radio Resource Control (RRC) layer, RRC signaling (also referred to as a Radio Resource Control message (RRC message) or Radio Resource Control information (RRC information)). Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling.

The NPDSCH is used to transmit the RRC signaling and the MAC CE. Here, the RRC signaling transmitted from the base station apparatus 3 on the NPDSCH may be signaling common to multiple terminal apparatuses 1 in a cell. The RRC signaling transmitted from the base station apparatus 3 on the NPDSCH may be signaling dedicated to a certain terminal apparatus 1 (also referred to as dedicated signaling or UE specific signaling). A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1.

Physical channels (NPDCCH, NPDSCH, and NPUSCH) corresponding to the same data (transport block) may be repeatedly transmitted in contiguous subframes. The Repetition Levels (RL) of the physical channels may be controlled for each physical channel. The repetition level 1 means that the physical channel corresponding to the same data is not repeatedly transmitted. The repetition level larger than 1 means that the physical channel corresponding to the same data is repeatedly transmitted. That is, the repetition level is associated with the length of one transmission instance/attempt/bundle of the physical channel in the time domain.

The repetition level may be based on at least some or all of the downlink control information, the RRC signaling, the MAC CE, and a coverage level. The coverage level includes at least a first coverage level and a second coverage level. The coverage level may include three or more coverage levels.

The coverage level is associated with the repetition level. The terminal apparatus for which the first coverage level has been configured may transmit or receive the physical channel having the repetition level of X or less. The terminal apparatus 1 for which the first coverage level has been configured may not transmit or receive the physical channel having the repetition level larger than X. The terminal apparatus 1 for which the second coverage level has been configured may transmit or receive the physical channel having the repetition level larger than X. For example, X may be 1 or 3.

The terminal apparatus 1 may configure the coverage level based on information received from the base station apparatus 3, and a Reference Signal Received Power (RSRP) of a signal (NDL RS) received from the base station apparatus 3. Here, the information may be the downlink, control information, the RRC signaling, or the MAC CE.

Apparatus configurations according to the present embodiment will be described below.

Figure 5:
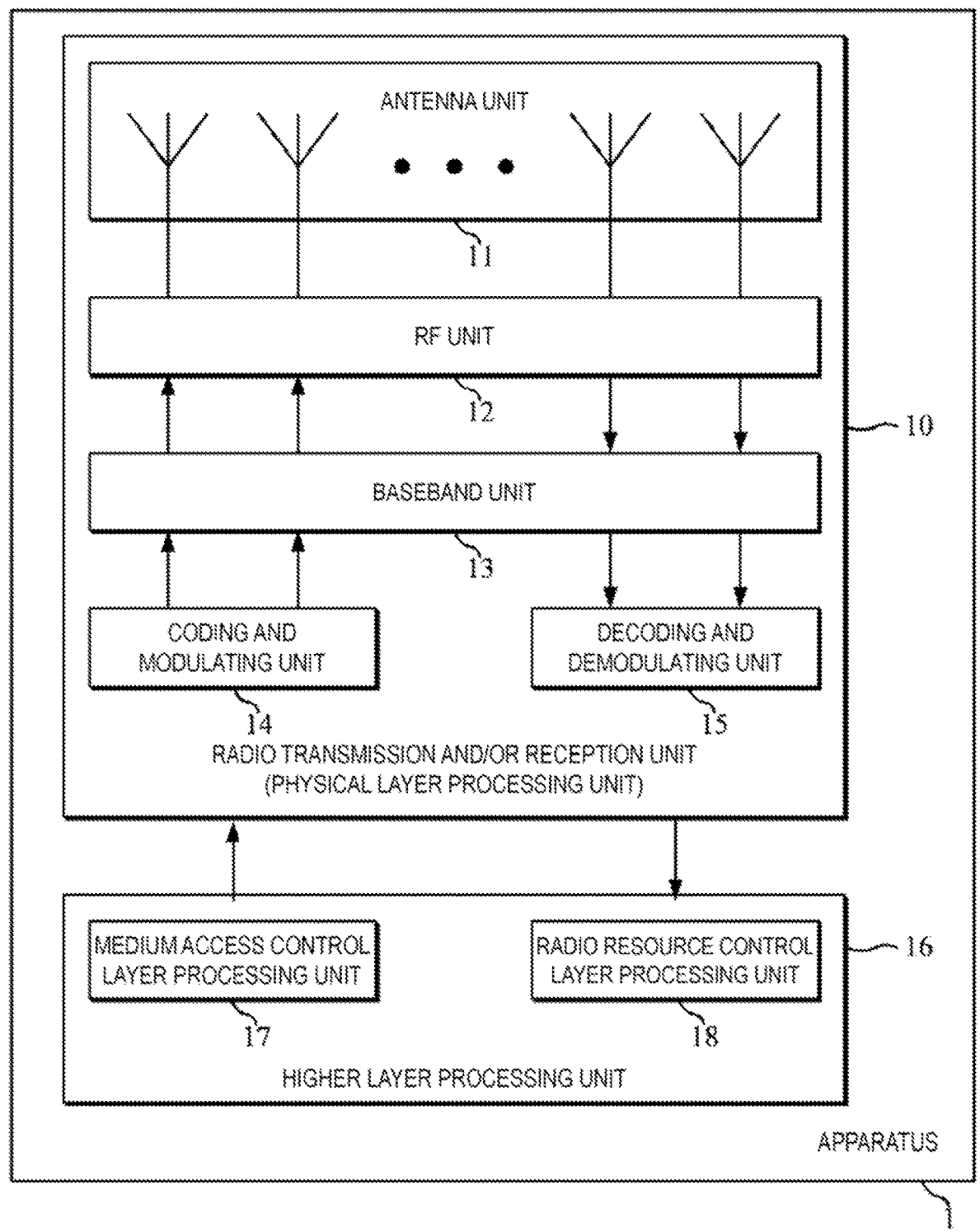
FIG. 5 is a schematic block diagram illustrating a configuration of a terminal apparatus 1 according to the present embodiment.

FIG. 5 is a schematic block diagram illustrating a configuration of the terminal apparatus 1 according to the present embodiment. As illustrated, the terminal apparatus 1 is configured to include a radio transmission and/or reception unit 10 and a higher layer processing unit 16. The radio transmission and/or reception unit 10 is configured to include an antenna unit 11, a Radio Frequency (RF) unit 12, a baseband unit 13, a coding and modulating unit 14, and a decoding and demodulating unit 15. The higher layer processing unit 16 is configured to include a medium access control layer processing unit 17 and a radio resource control layer processing unit 18. The radio transmission and/or reception unit 10 is also referred to as a transmitter, a receiver or a physical layer processing unit.

The higher layer processing unit 16 outputs uplink data (transport block) generated by a user operation or the like, to the radio transmission and/or reception unit 10. The higher layer processing unit 16 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 17 included in the higher layer processing unit 16 performs processing of the Medium Access Control layer. The medium access control layer processing unit 17 controls transmission of a scheduling request, based on various types of configuration information/parameters managed by the radio resource control layer processing unit 18.

The radio resource control layer processing unit 18 included in the higher layer processing unit 16 performs processing of the Radio Resource Control layer. The radio resource control layer processing unit 18 manages the various types of configuration information/parameters of the terminal apparatus 1. The radio resource control layer processing unit 18 sets the various types of configuration information/parameters, based on higher layer signaling received from the base station apparatus 3. That is, the radio resource control layer processing unit 18 sets the various types of configuration information/parameters, based on information indicating the various types of configuration information/parameters received from the base station apparatus 3.

The coding and modulating unit 14 included in the radio transmission and/or reception unit 10 performs processing of the physical layer, such as coding and modulation. The decoding and demodulating unit 15 included in the radio transmission and/or reception unit 10 performs processing of the physical layer, such as decoding and demodulation. The radio transmission and/or reception unit 10 demultiplexes, demodulates, and decodes a signal received from the base station apparatus 3, and outputs the information resulting from the decoding to the higher layer processing unit 16. The radio transmission and/or reception unit 10 modulates and codes data to generate a transmit signal, and transmits the transmit signal to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 generates a baseband digital signal and converts the baseband digital signal to an analog signal. The baseband unit 13 outputs the analog signal resulting from the conversion, to the RF unit 12.

The RF unit 12 removes unnecessary frequency components from the analog signal input from the baseband unit 13 using a low-pass up-converts the analog signal into a signal of a carrier frequency, and transmits the up-converted analog signal via the antenna unit 11. Furthermore, the RF unit 12 amplifies power. Furthermore, the RF unit 12 may have a function of controlling transmit power. The RF unit 12 is also referred to as a transmit power control unit.

Figure 6:
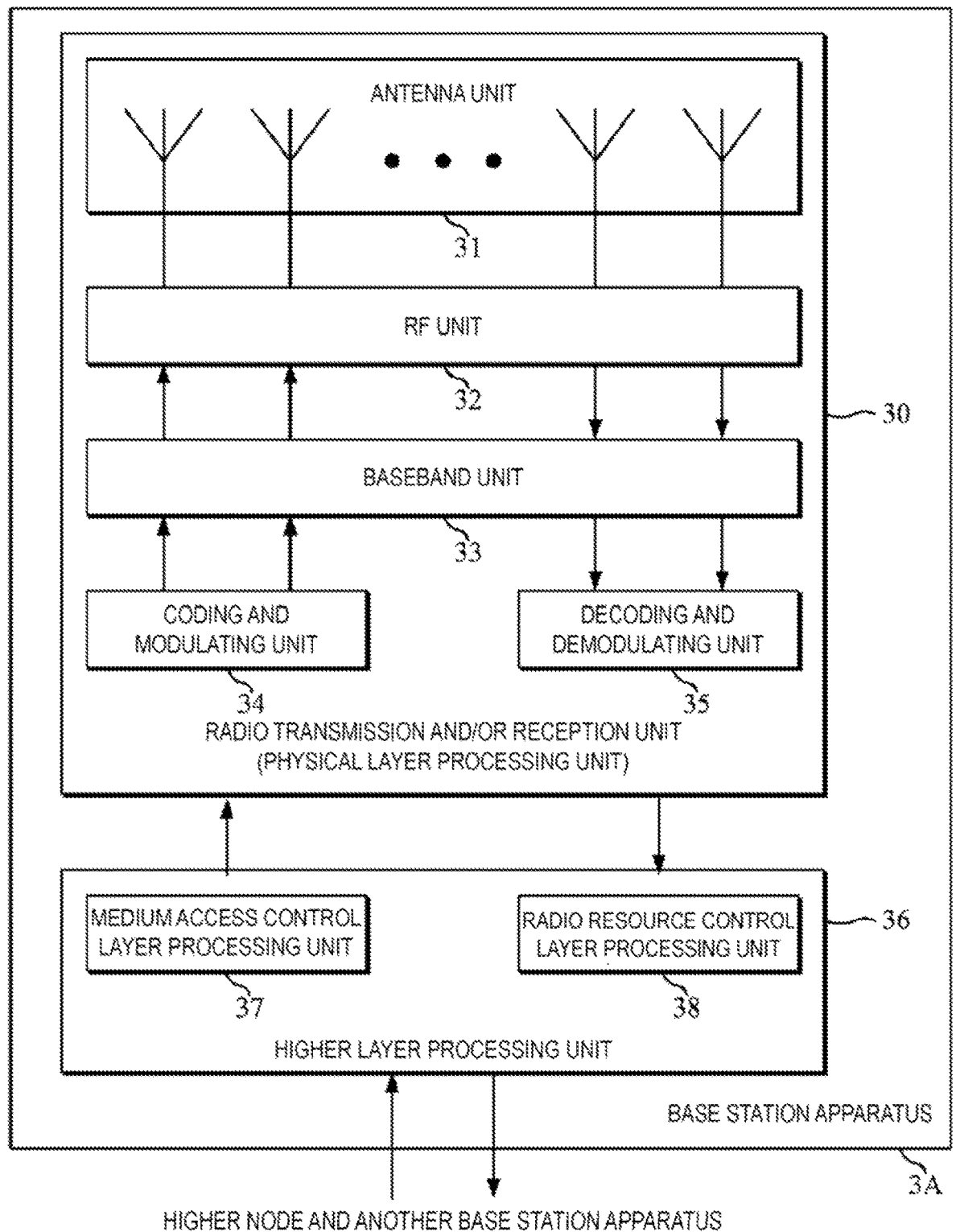
FIG. 6 is a schematic block diagram illustrating a configuration of a base station apparatus 3 according to the present embodiment.

FIG. 6 is a schematic block diagram illustrating a configuration of the base station apparatus 3A according to the present embodiment. The configuration of the base station apparatus 3A is the same as a configuration of the base station apparatus 3B. As illustrated, the base station apparatus 3A is configured to include a radio transmission and/or reception unit 30 and a higher layer processing unit 36. The radio transmission and/or reception unit 30 is configured to include an antenna unit 31, an RF unit 32, a baseband unit 33, a coding and modulating unit 34, and a decoding and demodulating unit 35. The higher layer processing unit 36 is configured to include a medium access control layer processing unit 37 and a radio resource control layer processing unit 38. The radio transmission and/or reception unit 30 is also referred to as a transmitter, a reception unit or a physical layer processing unit.

The higher layer processing unit 36 performs processing of the Medium Access Control (MAC) layer, the Packet Data, Convenience Protocol (PDCP) layer, the Radio Link Control (RLC) layer, and the Radio Resource Control (RRC) layer.

The medium access control layer processing unit 37 included in the higher layer processing unit 36 performs processing of the Medium Access Control layer. The medium access control layer processing unit 37 performs processing associated with a scheduling request, based on various types of configuration information/parameters managed by the radio resource control layer processing unit 38.

The radio resource control layer processing unit 38 included in the higher layer processing unit 36 performs processing of the Radio Resource Control layer. The radio resource control layer processing unit 38 generates, or acquires from a higher node, downlink data (transport block) allocated to a physical downlink shared channel, system information, an RRC message, a MAC Control Element (CE), and the like, and outputs the generated or acquired data to the radio transmission and/or reception unit 30. Furthermore, the radio resource control layer processing unit 38 manages various types of configuration information/parameters for each of the terminal apparatuses 1. The radio resource control layer processing unit 38 may set various types of configuration information/parameters for each of the terminal apparatuses 1 through the higher layer signaling. In other words, the radio resource control layer processing unit 38 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 18 included in the terminal apparatus 1 may be configured as a circuit. Each of the units having the reference signs 30 to 38 included in the base station apparatus 3 may be configured as a circuit.

Figure 7:
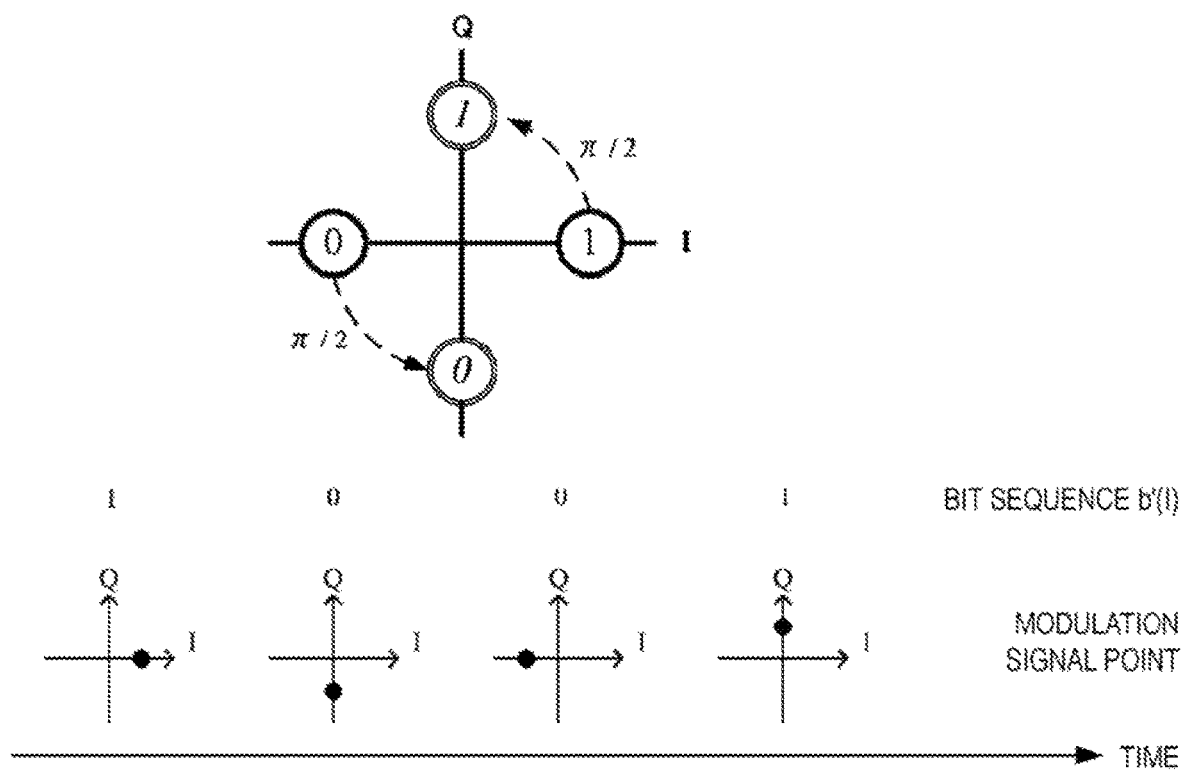
FIG. 7 is a diagram illustrating an example of a signal point of $\pi/2$-BPSK according to the present embodiment.
Figure 8:
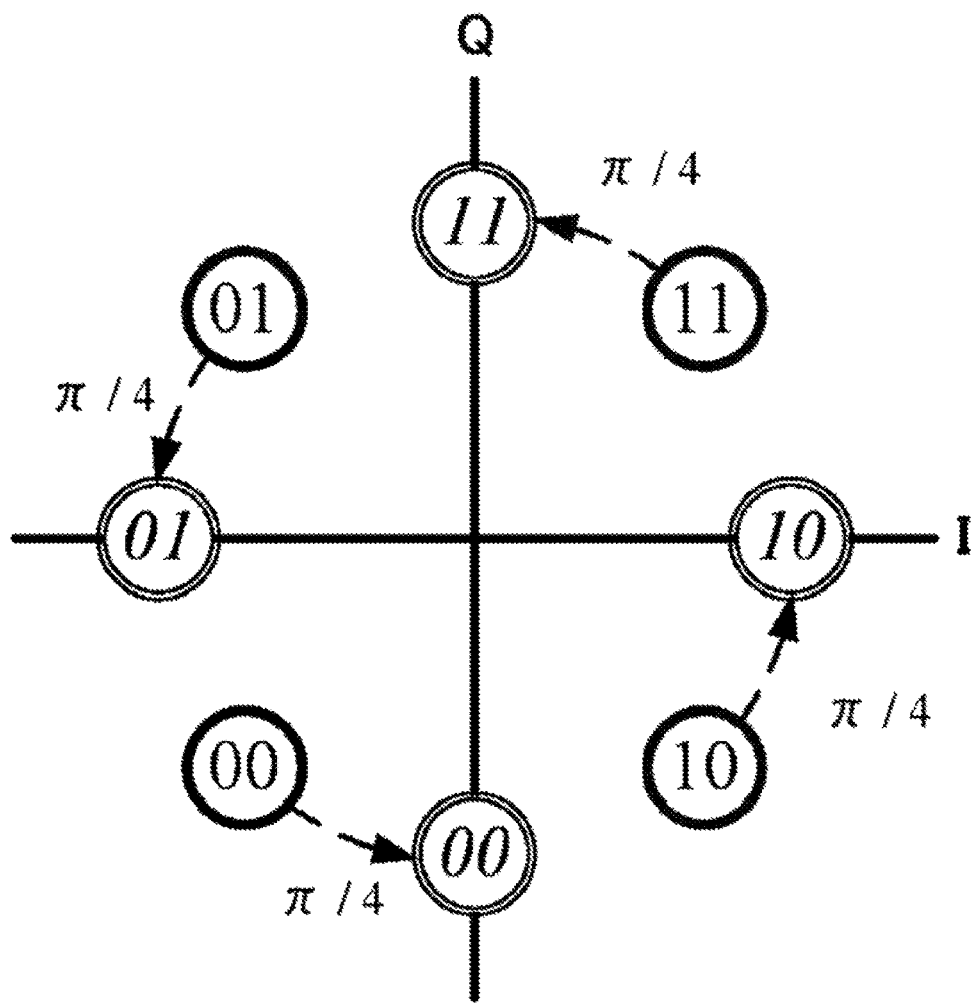
FIG. 8 is a diagram illustrating an example of a signal point of $\pi/4$-QPSK according to the present embodiment.
Figure 8:
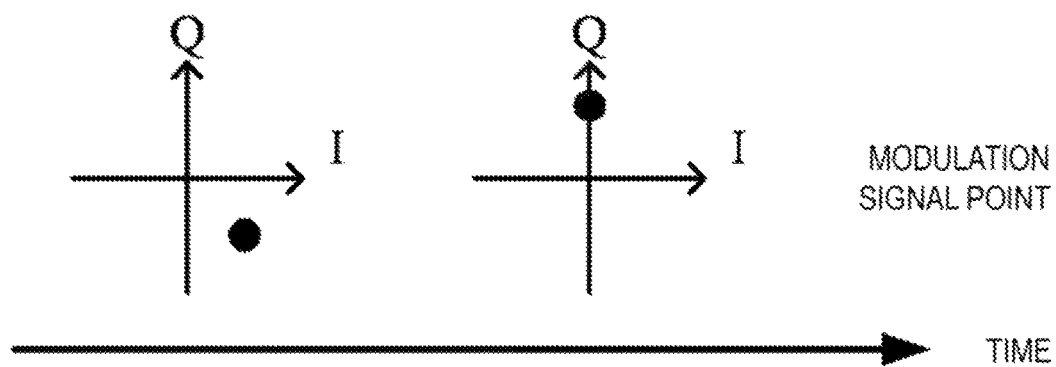

The coding and modulating unit 14 included in the terminal apparatus 1 applies a π/2-Binary Phase Shift Keying (BPSK) modulation scheme or a π/4-Quadrature Phase Shift Keying (QPSK) modulation scheme to a bit sequence transmitted on the NPUSCH. π/2-BPSK is also referred to as π/2-shift BPSK. π/4-QPSK is also referred to as π/4-shift QPSK. A modulation symbol is also referred to as a complex-valued symbol.

π/2-BPSK will be described. π/2-BPSK is a modulation scheme that causes each modulation symbol modulated by BPSK to have a relative phase shift of 90 degrees (π/2) between the adjacent modulation symbols. FIG. 7 is a diagram illustrating an example of a signal point (constellation) of π/2-BPSK according to the present embodiment. In FIG. 7, a bit sequence mapped to modulation signals is 1001. In the present embodiment, I is an In-phase channel, and Q represents a Quadrature channel, in a case of π/2-BPSK in FIG. 7, assuming that an initial phase is zero, a first bit "1" is mapped on the in-phase channel, and a second bit "0" is mapped on the quadrature channel by rotating the phase of the BPSK-modulated modulation symbol by 90 degrees. Similarly, a third bit "0" is mapped on the in-phase channel, and a fourth bit "1" is mapped on the quadrature channel. That is, in FIG. 7, the phases of the even-numbered π/2-BPSK modulation symbols are not rotated, and the phases of the odd-numbered π/2-BPSK modulation symbols are rotated by 90 degrees.

π/4-QPSK will be described. π/4-QPSK is a modulation scheme that causes each modulation symbol modulated by QPSK to have a relative phase shift of 45 degrees (π/4) between the adjacent modulation symbols. FIG. 8 is a diagram illustrating an example of a signal point of π/4-QPSK, according to the present embodiment. In FIG. 8, a bit sequence mapped to modulation signals is 1001. In a case of π/4-QPSK in FIG. 8, assuming that an initial phase is zero, first two bits "10" are mapped such that a first bit is allocated to the amplitude of the in-phase channel and a second bit is allocated to the amplitude of the quadrature channel. The next two bits "01" are mapped to a modulation signal point by rotating the phase of the QPSK symbol, allocated in accordance with the same rule as that for the first two bits, by 45 degrees. That is, in FIG. 8, the phases of the even-numbered π/4-QPSK modulation symbols are not rotated, and the phases of the odd-numbered π/4-QPSK modulation symbols are rotated by 45 degrees.

In this way, π/2-BPSK or π/4-QPSK makes it possible to suppress fluctuation of a modulation signal envelope and significantly suppress power consumption by causing adjacent symbols to have a relative phase shift.

A signal point of a π/2-BPSK modulation symbol may be $\{1, -1, j, -20\}$. The signal point of the π/2-BPSK modulation symbol may be a signal point $\{e^{j \cdot \pi/4}, e^{j \cdot 3\pi/4}, e^{j \cdot 5\pi/4}, e^{j \cdot 7\pi/4}\}$ by rotating $\{1, -1, j, -j\}$ by 45 degrees. Here, e is the Napier's number and j is an imaginary unit.

Figure 9:
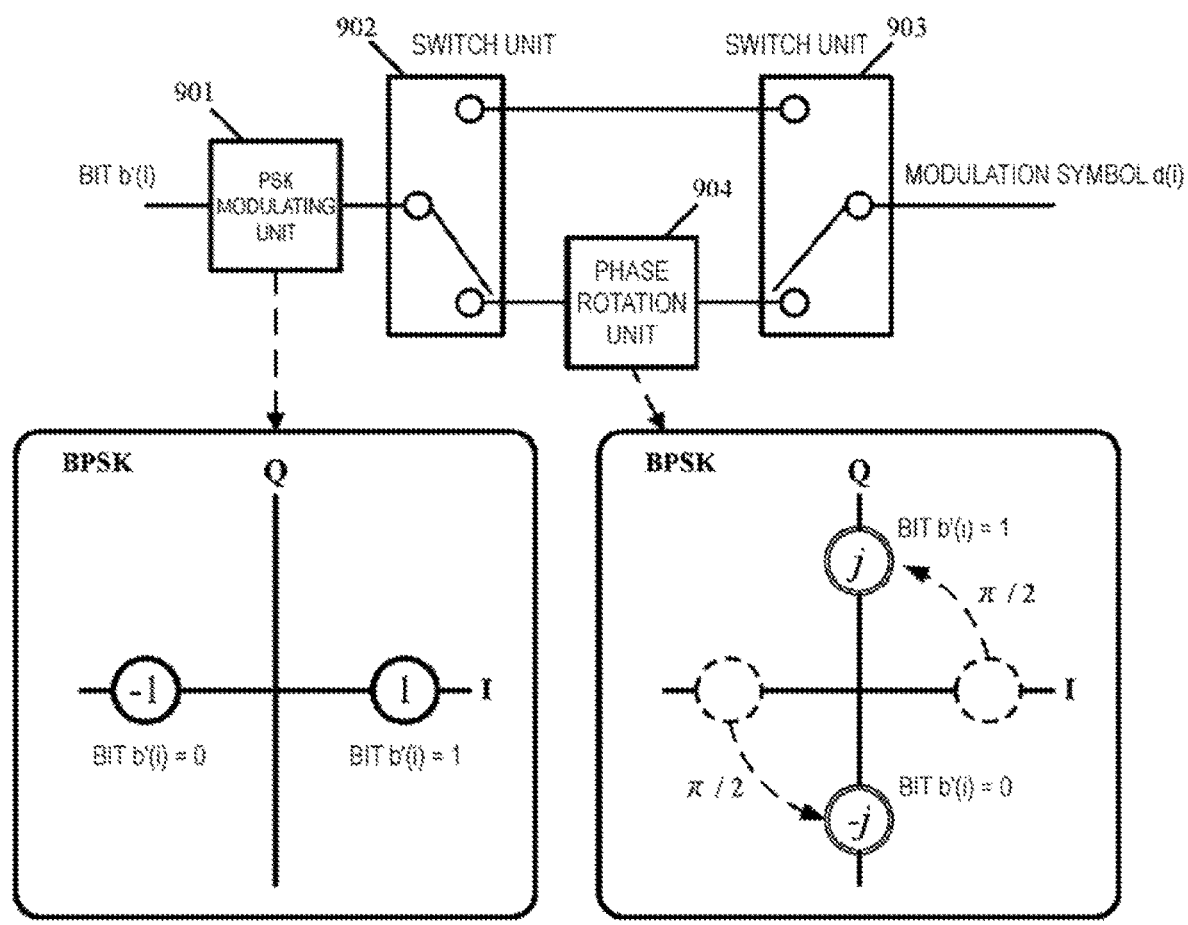
FIG. 9 is a schematic block diagram for generating a $\pi/2$-BPSK modulation symbol and a $\pi/4$-QPSK modulation symbol according to the present embodiment.

FIG. 9 is a schematic block diagram for generating a π/2-BPSK modulation symbol and a π/4-QPSK modulation symbol according to the present embodiment. An input bit sequence b'(i) (encoded bit, information bit, and the like) is modulated to BPSK modulation symbols or QPSK modulation symbols by a PSK modulating unit 901. A switch 902 and a switch 903 each are switched between adjacent modulation symbols. In a case that the switch 902 and the switch 903 are connected to upper contact points, the BPSK modulation symbols or the QPSK modulation symbols are output as they are in a case that the switch 902 and the switch 903 are connected to lower contact points, the phases of the BPSK modulation symbols or the QPSK modulation symbols are rotated by 90 degrees or 45 degrees by a phase rotation unit 504, and the modulation symbols whose phases have been rotated are output. The coding and modulating unit 14 of the terminal apparatus 1 may include the PSK modulating unit 901, the switch unit 902, the switch unit 903, and the phase rotation unit 904.

Here, FIG. 9 is merely an example, and since the principle of π/2-BPSK and π/4-QPSK is to cause adjacent symbols to have a relative phase shift, there is no need to use the same configuration as that in FIG. 9 as long as the same effect can be acquired, and any configuration can be used if the configuration realizes π/2-BPSK and π/4-QPSK. Although π/2-BPSK and π/4-QPSK have been described here, use of a different phase shift modulation, such as π/8-8PSK that causes adjacent symbols to have a relative phase shift of 22.5 degrees, remains within the scope of an embodiment of the present invention. In addition, although synchronous detection that detects a signal by playing back a carrier is assumed here, π/2-Differential Binary Phase Shift Keying (DBPSK) and π/4-Differential Quadrature Phase Shift Keying (DQPSK) that can detect a signal by using differential coding and delay detection can also be used.

A signal point/phase rotation of a first modulation symbol d(0) of a modulation symbol sequence d(i) corresponding to the input bit sequence b'(i) may be given based on at least some or all of the following of (A) to (F).

(A) NPCI of an NB-IoT cell
(B) Parameter of a higher layer (RRC layer)
(C) RNTI to which an NPUSCH transmission corresponds
(D) Identifier (identity) of the terminal apparatus 1
(E) Subcarrier index/number k to which an NPUSCH transmission corresponds
(F) First subframe to which an NPUSCH transmission corresponds The base station apparatus 3 may transmit an NPDSCH including the (B) parameter of a higher layer (RRC layer) to the terminal apparatus 1. The (C) RNTI to which an NPUSCH transmission corresponds is a C-RNTI, a Temporary C-RNTI, or an SPS C-RNTI. The (C) RNTI to which an NPUSCH transmission corresponds is an RNTI included in an NPDCCH used to allocate a resource element (subcarrier) of an NPUSCH. The (C) RNTI to which an NPUSCH transmission corresponds is an RNTI used to scramble CRC parity bits attached to downlink control information used to allocate a resource element (subcarrier) of an NPUSCH.

For example, in a case of $\{(A)+(E)\}$ mod2=0, a signal point of a first $\pi/2$-DBPSK modulation symbol d(0) may be $\{1\}$. For example, in a case of $\{(A)+(E)\}$ mod2=1, the signal point of the first $\pi/2$-DBPSK modulation symbol d(0) may be $\{j\}$. Here, j is an imaginary unit. Here, XmodY is a function returning a remainder acquired by dividing X by Y. Here, (A) is an NPCI of an NB-IoT cell, and (E) is a subcarrier index/number k to which an NPUSCH transmission corresponds.

Figure 10:
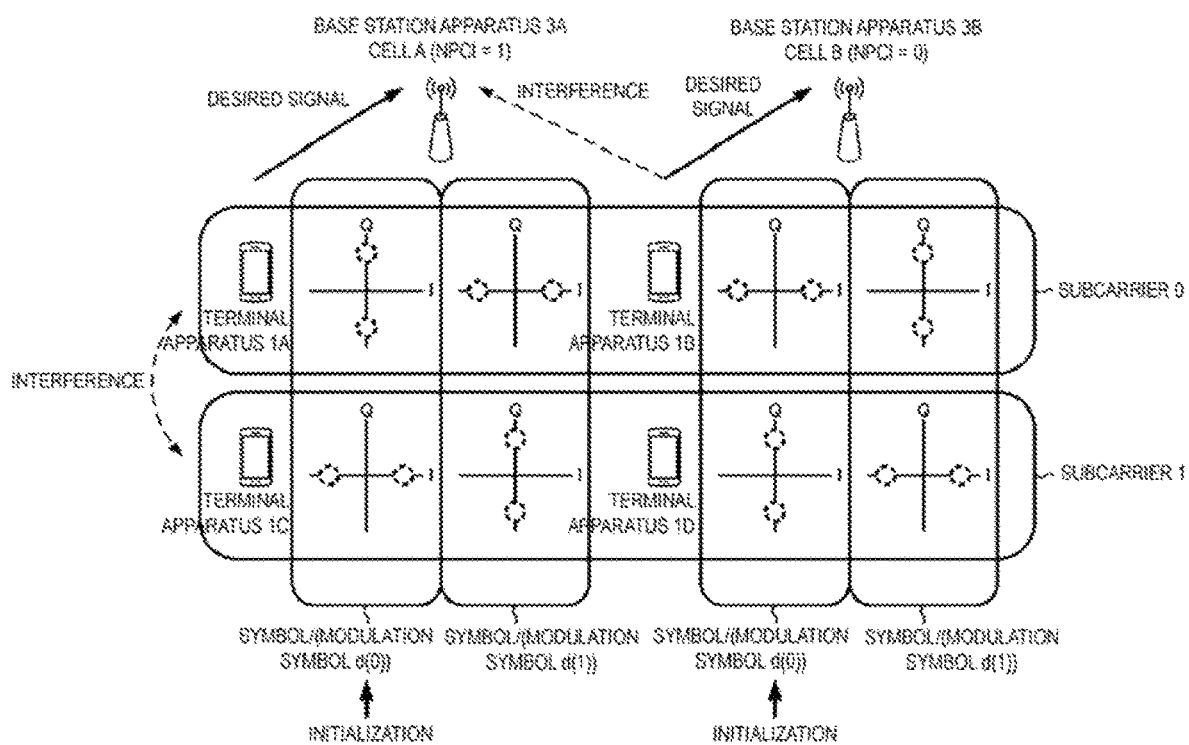
FIG. 10 is a diagram illustrating an example of a signal point of the π/2-BPSK modulation symbol according to the present embodiment.

FIG. 10 is a diagram illustrating an example of a signal point of a $\pi/2$-BPSK modulation symbol according to the present embodiment. In FIG. 10, the terminal apparatus 1A and the terminal apparatus 1C communicate with the base station apparatus 3A (cell 3A). In FTC. 10, the terminal apparatus 1B and the terminal apparatus 1D communicate with the base station apparatus 3B (cell 3B). An NPCI of the cell 3A is 0. An NPCI of the cell 3B is 1. The terminal apparatus 1A and the terminal apparatus 1B transmit an NPUCH signal on a subcarrier 0. The terminal apparatus 1C and the terminal apparatus 1D transmit an NPUSCH signal on a subcarrier 1. The terminal apparatus 1A, the terminal apparatus 1B, the terminal apparatus 1C, and the terminal apparatus 1D start transmission of the NPUSCH signal from the symbol 1.

In FIG. 10, in a case of $\{(A)+(E)\}$mod2=0, a signal point of a first $\pi/2$-BPSK modulation symbol d(0) is any one of a first set of signal points $\{1, -1\}$. That is, in the case of $\{(A)+(E)\}$mod2=0, a phase rotation by 90 degrees is not applied to the first $\pi/2$-BPSK modulation symbol d(0). Here, (A) is an NPCI of an NB-IoT cell, and (E) is a subcarrier index/number k to which an NPUSCH transmission corresponds. In FIG. 10, the terminal apparatus 1B and the terminal apparatus 1C satisfy $\{(A)+(E)\}$ mod2=0.

In FIG. 10, in a case of $\{(A)+(E)\}$ mod2=1, the signal point of the first $\pi/2$-BPSK modulation symbol d(0) is any one of a second set of signal points $\{j, -j\}$. That is, in the case of $\{(A)+(E)\}$ mod2=1, a phase rotation of 90 degrees is applied to the first $\pi/2$-BPSK modulation symbol d(0). Here, (A) is an NPCI of an NB-IoT cell, and (E) is a subcarrier index/number k to which an NPUSCH transmission corresponds. In FIG. 10, the terminal apparatus 1A and the terminal apparatus 1D satisfy $\{(A)+(E)\}$ mod2=1.

In this way, by giving the signal point phase rotation of the first $\pi/2$-BPSK modulation symbol d(0) based on the (A) NPCI of an NB-IoT cell, it is possible to reduce inter-cell interference. In this way, by giving the signal point/phase rotation of the first $\pi/2$-BPSK modulation symbol d(0) based on the (E) subcarrier index number k to which an NPUSCH transmission corresponds, it is possible to reduce inter-subcarrier symbol interference and improve balance between I and Q in the symbol 1. In addition, by giving the signal point/phase rotation of the first $\pi/2$-BPSK modulation symbol d(0) based on some or all of the above-described items of (A) to (F), it is possible to randomize inter-cell and inter-subcarrier interference. Determining the signal point/phase rotation of the first $\pi/2$-BPSK modulation symbol d(0) based on some or all of the above-described items of (A) to (F) is also referred to as initialization of a $\pi/2$-BPSK modulation symbol.

The signal point/phase rotation initialization of $\pi/2$-BPSK modulation symbols d(i) based on some or all of the above-described (A) to (F) may be performed by using one of the following of (G) to (K) as a unit.

Figure 11:
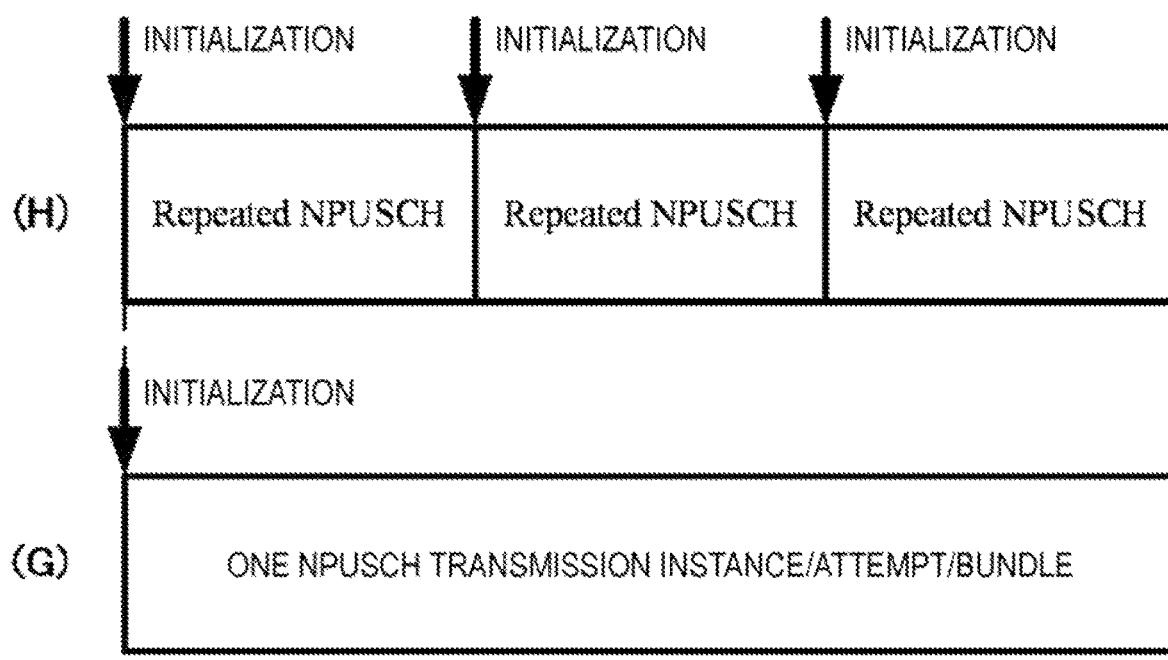
FIG. 11 is a diagram illustrating an example of signal point/phase rotation initialization of π/2-BPSK modulation symbols d(i) according to the present embodiment.
Figure 12:
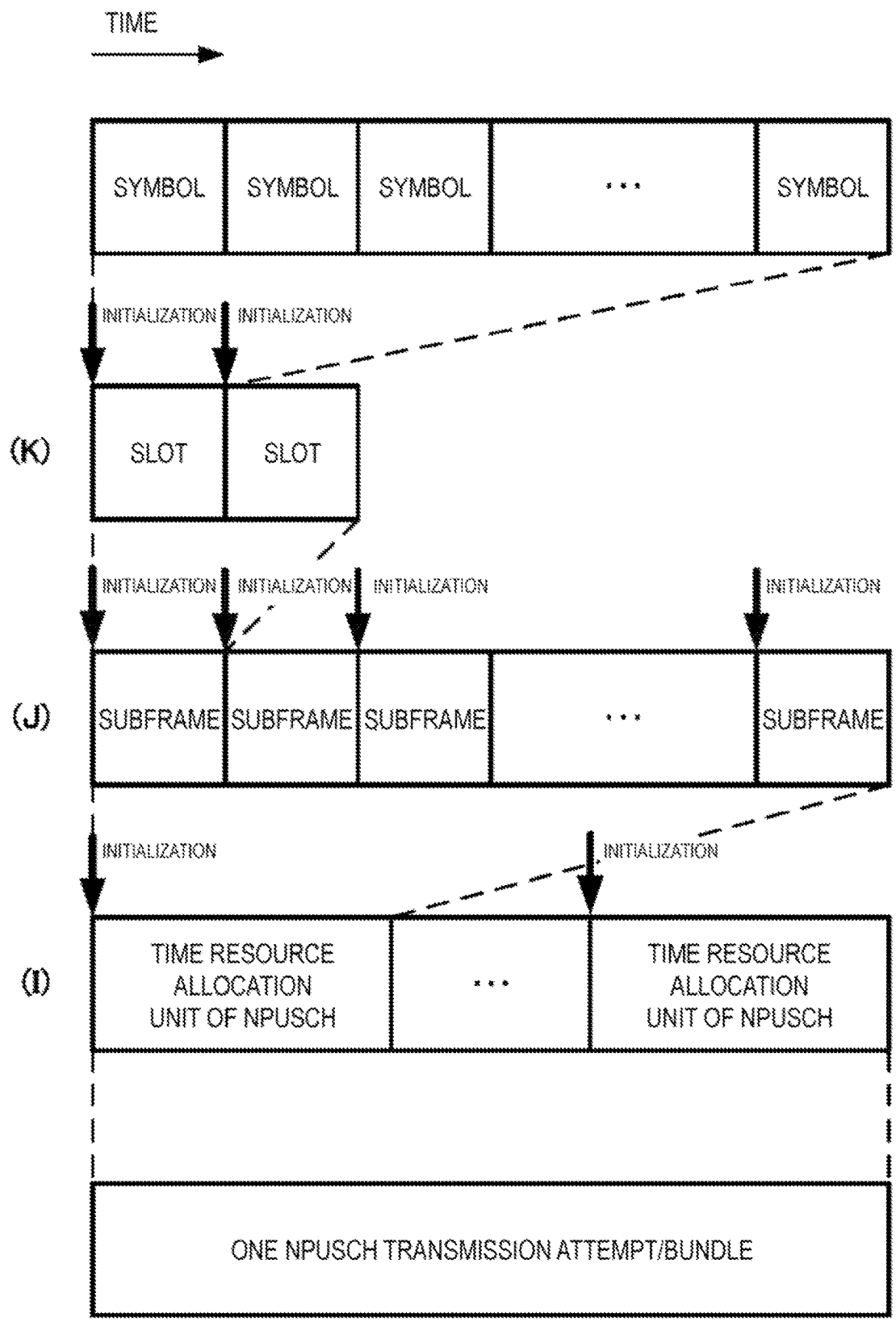
FIG. 12 is a diagram illustrating an example of signal point/phase rotation initialization of the π/2-BPSK modulation symbols d(i) according to the present embodiment.

(G) One transmission instance/attempt/bundle
(H) NPUSCH repeatedly transmitted in one transmission instance/attempt/bundle
(I) Time resource allocation unit of an NPUSCH
(J) Subframe
(K) Slot FIGS. 11 and 12 are diagrams illustrating an example of signal point/phase rotation initialization of $\pi/2$-BPSK modulation symbols d(i) according to the present embodiment. In (G) in FIG. 11, the signal point/phase rotation initialization is performed for first $\pi/2$-BPSK modulation symbols d(i) of one transmission instance/attempt/bundle. In (H) in FIG. 11, the signal point/phase rotation initialization is performed for each of first $\pi/2$-BPSK modulation symbols d(i) of NPUSCHs included in the one transmission instance/attempt/bundle.

In (I) in FIG. 12, the signal point/phase rotation initialization is performed for each of first $\pi/2$-BPSK modulation symbols d(i) in NPUSCH time resource allocation units included in the one transmission instance/attempt/bundle. For example, the NPUSCH time resource allocation unit is eight subframes. In (J) in FIG. 12, the signal point/phase rotation initialization is performed for each of first $\pi/2$-BPSK modulation symbols d(i) in subframes included in the one transmission instance/attempt/bundle. In (K) in FIG. 12, the signal point/phase rotation initialization is performed for each of first $\pi/2$-BPSK modulation symbols d(i) in slots included in the one transmission instance/attempt/bundle.

NUL RS associated with NPUSCH will be described. NUL RS is also referred to as a reference symbol.

Figure 13:
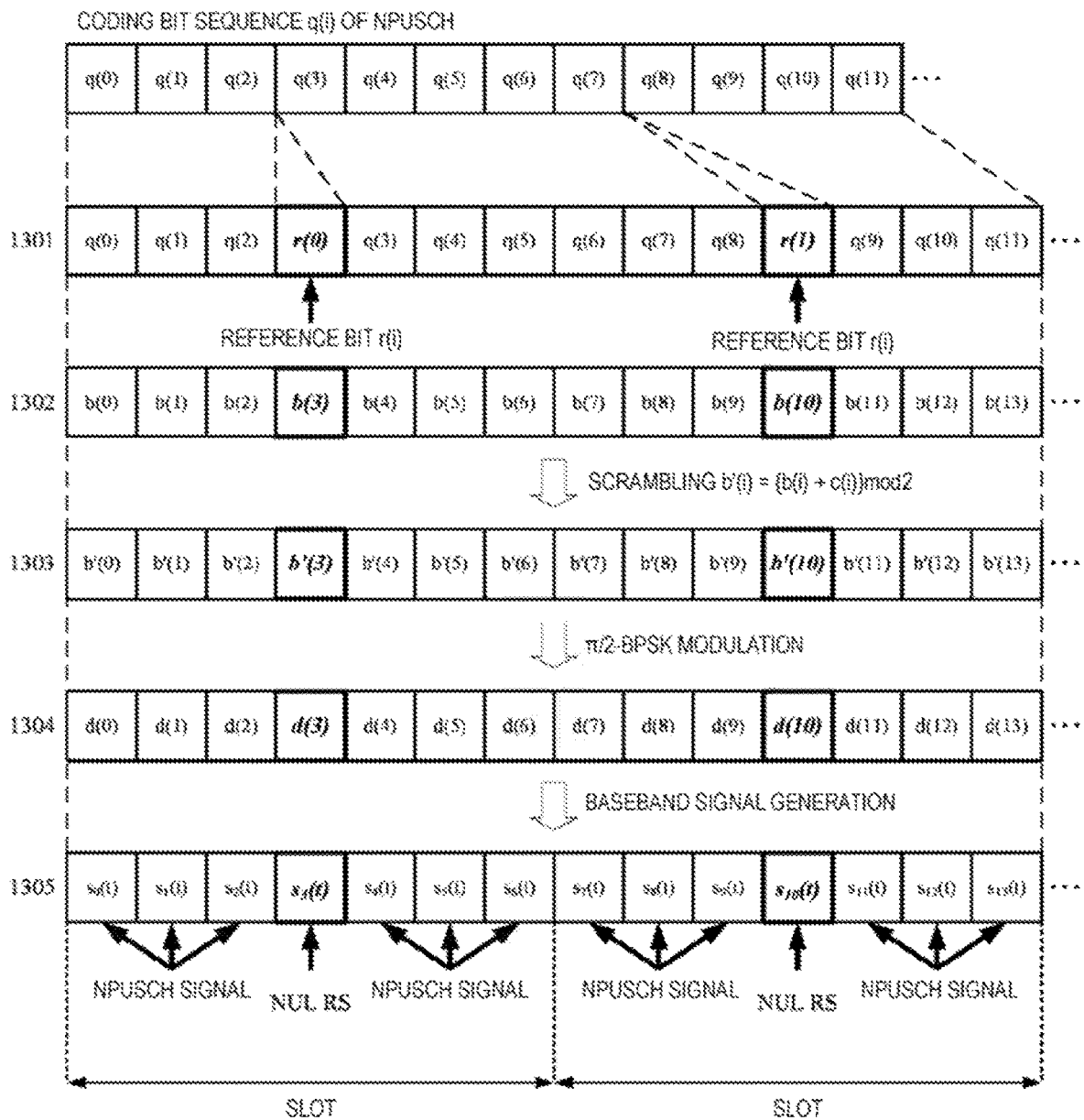
FIG. 13 is a diagram illustrating an example of an NUL RS associated with an NPUSCH to which π/2-BPSK is applied according to the present embodiment.

FIG. 13 is a diagram illustrating an example of an NUL RS associated with an NPUSCH to which $\pi/2$-BPSK is applied according to the present embodiment. In FIG. 13, the NUL RS corresponds to a fourth symbol in each slot, in step 1301, reference bits r(i) are inserted into a coding bit sequence q(i) of the NPUSCH (uplink data and/or uplink control information). In a case of $\pi/2$-BPSK, the reference bits r(i) are inserted bit by bit. In step 1302, the coding bit sequence q(i) of the NPUSCH into which the reference bits r(i) have been inserted is defined as a bit sequence b(i).

In step 1303, a bit sequence b'(i) is given by scrambling the bit sequence b(i) by using a pseudo-random sequence c(i). The pseudo-random sequence c(i) may be initialized based on at least some or all of the above-described (A) to (F).

In a case that the NPUSCH is transmitted in a plurality of subframes, the pseudo-random sequence c(i) may be initialized for each block of the X subframes. For example, X is 4. Here, the initialization of the pseudo-random sequence c(i) for the block may be performed based on at least an index of the block.

In step 1304, modulation symbols d(i) are generated from the bit sequence b'(i) by using the $\pi/2$-BPSK modulation.

In step 1305, from the modulation symbols d(i), time continuous signals $s_i(t)$ in the symbols are generated. The time continuous signals are also referred to as baseband signals. In step 1305, the time continuous signals $s_i(t)$ in the symbols are acquired by mapping each of the modulation symbols d(i) to a resource element to which the NPUSCH has been allocated and performing frequency domain sine pulse shaping and Cyclic Prefix (CP) insertion for each of the modulation symbols d(i). Here, the modulation symbols d(i) and the time continuous signals $s_i(t)$ correspond to the same subcarrier k. The subcarrier k to which the NPUSCH corresponds may be indicated by downlink control information.

As described above, since both the coding bit sequence q(i) of the NPUSCH and the reference bits r(i) are subjected to the π/2-BPSK modulation, it is possible to suppress envelope fluctuation between the NPUSCH signal and the reference signal and greatly suppress power consumption. In addition, as described above, by scrambling both the coding bit sequence q(i) of the NPUSCH and the reference bits r(i) by using pseudo-random sequence c(i), it is possible to simplify a constitution of the terminal apparatus 1 and randomize interference between cells having the same frequency but located at different geographical positions.

Here, the reference bit sequence r(i) may be a pseudo-random sequence c'(i), which is different from the above-described pseudo-random sequence c(i), and may not be scrambled by the above-described pseudo-random sequence c(i). The pseudo-random sequence c(i) may be initialized based on at least some or all of the following (A) to (F). The pseudo-random sequence c(i) and the pseudo-random sequence c'(i) may be initialized based on a different set of parameters. For example, the pseudo-random sequence c(i) may be initialized based on at least the (A) NPCI of an NB-IoT cell and the (C) RNTI to which an NPUSCH corresponds, and the pseudo-random sequence c'(i) may be initialized based on at least the (A) NPCI of an NB-IoT cell and the (E) subcarrier index/number k to which an NPUSCH corresponds. This makes it possible to randomize the inter-cell interference for the NPUSCH signal. In addition, it is possible to configure an NPCI for each cell considering combinations of NUL RSs among the cells.

Figure 14:
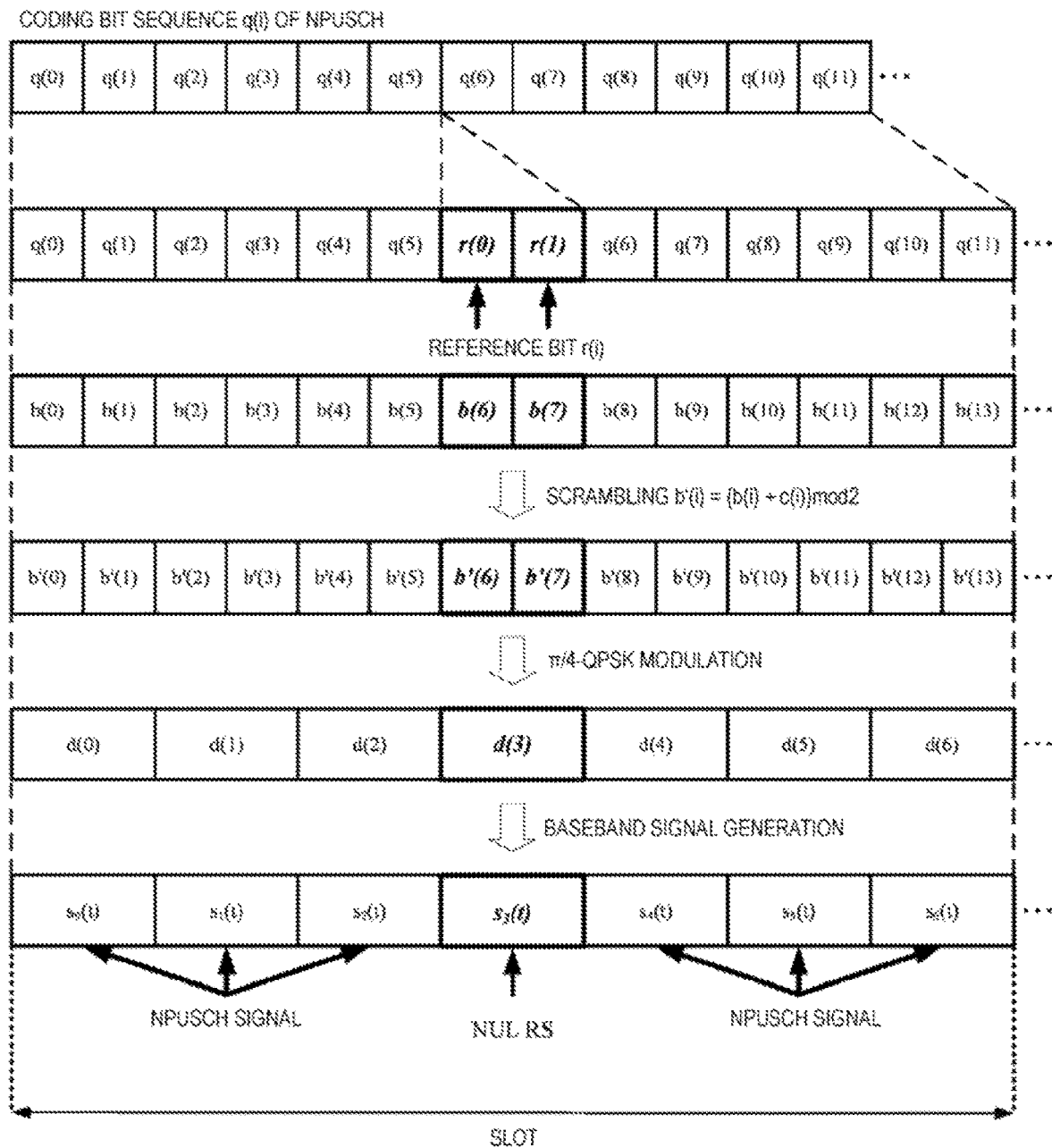
FIG. 14 is a diagram illustrating an example of a reference signal associated with an NPUSCH to which π/4-QPSK is applied according to the present embodiment.

FIG. 14 is a diagram illustrating an example of a reference signal associated with an NPUSCH to which π/4-QPSK according to the present embodiment is applied. FIG. 14 differs from FIG. 10 in that, when reference bits r(i) are inserted, two bits are inserted at a time.

Aspects of the terminal apparatus 1 according to the present embodiment will be described below.

(1) A first aspect of the present embodiment, is the terminal apparatus 1 including: the transmitter 10 that transmits information (uplink data and/or uplink control information) on a channel (NPUSCH); and the modulating unit 14 that generates a π/2-shift BPSK modulation symbol sequence d(i) by performing a π/2-shift Binary Phase Shift Keying (BPSK) modulation on a bit sequence b'(i) of the information; wherein a signal point of a first π/2-shift BPSK modulation symbol d(0) of the π/2-shift BPSK modulation symbol sequence d(i) is given based on at least a subcarrier index k of a subcarrier to which the channel corresponds, and/or a Narrowband Physical layer Cell. Identity (NPCI).

(2) A second aspect of the present embodiment is the terminal apparatus 1 including: the transmitter 10 that transmits information (uplink data and/or uplink control information) on a channel (NPUSCH): and the modulating unit 14 that generates a π/2-shift BPSK modulation symbol sequence d(i) by performing a π/2-shift Binary Phase Shift Keying (BPSK) modulation on a bit sequence b'(i) of the information; wherein a signal point of a first π/2-shift BPSK modulation symbol d(0) of the π/2-shift BPSK modulation symbol sequence d(i) is a signal point included in a set of signal points, the set of signal points being {1, −1} or {j, −j}, and is given based on at least a subcarrier index k of a subcarrier to which the channel corresponds, and/or a Narrowband Physical layer Cell Identity (NPCI), where j is an imaginary unit.

(3) A third aspect of the present embodiment is the terminal apparatus 1 including: the transmitter 10 that transmits information (uplink data and/or uplink control information) on a channel (NPUSCH); and the modulating unit 14 that generates a π/2-shift BPSK modulation symbol sequence d(i) by performing a π/2-shift Binary Phase Shift Keying (BPSK) modulation on a bit sequence b'(i) of the information; wherein a phase rotation of 0 degree or 90 degrees is alternately applied to each symbol of the π/2-shift BPSK modulation symbol sequence d(i), and the amount of the phase rotation applied to a first π/2-shift BPSK modulation symbol d(0) of the π/2-shift BPSK modulation symbol sequence d(i) is given based on at least a subcarrier index k of a subcarrier to which the channel corresponds, and/or a Narrowband Physical layer Cell Identity (NPCI).

(4) In the third aspect of the present embodiment, the terminal apparatus 1 includes the receiver 10 that detects the NPCI based on at least a Narrowband Secondary Synchronization Signal (NSSS) transmitted in the downlink.

(5) In the third aspect of the present embodiment, the receiver 10 receives a Narrowband Physical Downlink Control Channel (NPDCCH) including downlink control information indicating the subcarrier index k of the subcarrier to which the channel corresponds.

(6) A fourth aspect of the present embodiment is the base station apparatus 3 including: the receiver 30 that transmits information (uplink data and/or uplink control information) on a channel (NPUSCH) and the demodulating unit 35 that demodulates a π/2-shift Binary Phase Shift Keying (BPSK) modulation symbol sequence d(i) generated from a bit sequence b'(i) of the information; wherein a signal point of a first π/2-shift BPSK modulation symbol d(0) of the π/2-shift BPSK modulation symbol sequence d(i) is given based on at least a subcarrier index k of a subcarrier to which the channel corresponds, and/or a Narrowband Physical layer Cell Identity (NPCI).

(7) A fifth aspect of the present embodiment is the base station apparatus 3 including: the receiver 30 that transmits information (uplink data and/or uplink control information) on a channel (NPUSCH); and the demodulating unit 35 that demodulates a π/2-shift Binary Phase Shift Keying (BPSK) modulation symbol sequence d(i) generated from a bit sequence b'(i) of the information; wherein a signal point of a first π/2-shift BPSK modulation symbol d(0) of the π/2-shift BPSK modulation symbol sequence d(i) is a signal point included in a set of signal points, the set of signal points being {1, −1} or {j, −j}, and is given based on at least a subcarrier index k of a subcarrier to which the channel corresponds, and/or a Narrowband Physical layer Cell Identity (NPCI), where j is an imaginary unit.

(8) A sixth aspect of the present embodiment is the base station apparatus 3 including: the receiver 30 that transmits information (uplink data and/or uplink control information) on a channel (NPUSCH); and the demodulating unit 35 that demodulates a π/2-shift Binary Phase Shift Keying (BPSK) modulation symbol sequence d(i) generated from a bit sequence b'(i) of the information; wherein a phase rotation of 0 degree or 90 degrees is alternately applied to each symbol of the π/2-shift BPSK modulation symbol sequence d(i), and the amount of the phase rotation applied to a first π/2-shift BPSK modulation symbol d(0) of the π/2-shift BPSK modulation symbol sequence d(i) is given based on at least a subcarrier index k of a subcarrier to which the channel corresponds, and/or a Narrowband Physical layer Cell Identity (NPCI).

(9) In the sixth aspect of the present embodiment, the base station apparatus 3 includes the transmitter 30 that transmits a Narrowband Secondary Synchronization Signal (NSSS) generated based on the NPCI.

(10) In the sixth aspect of the present embodiment, the transmitter 30 transmits a Narrowband Physical Downlink Control Channel (NPDCCH) including downlink control information indicating the subcarrier index k of the subcarrier to which the channel corresponds.

The above-described embodiment may be applied to a $\pi/2$-BPSK modulation symbol, a $\pi/2$-DBPSK modulation symbol, a $\pi/4$-QPSK modulation symbol, and a $\pi/4$-DQPSK modulation symbol. In addition, the above-described embodiment may be applied to other modulation symbols.

This allows the terminal apparatus and the base station apparatus to efficiently communicate with each other.

The base station apparatus 3 according to the embodiment of the present invention can also be realized as an aggregation (an apparatus group) constituted of multiple apparatuses. Each of the apparatuses constituting such an apparatus group may include a part or all of functions or functional blocks of the base station apparatus 3 according to the above-described embodiment. The apparatus group needs to include a complete set of functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all of the functions of a higher node than an eNodeB.

A program running on an apparatus according to the embodiment of the present invention may serve as a program that controls a Central Processing Unit (CPU) and the like to cause a computer to operate in such a manner as to realize the functions of the above-described embodiment according to the embodiment of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the embodiment of the present invention defined by claims, and embodiments that are made by suitably combining technical means disclosed according to the different embodiments are also included in the technical scope of the embodiment of the present invention. Furthermore, a configuration in which a constituent element that achieves the same effect is substituted for the one that is described in the embodiments is also included in the technical scope of the present invention.

CROSS-REFERENCE OF RELATED APPLICATION

This application claims priority based on JP 2016-046647 filed in Japan on Mar. 10, 2016, the contents of which are incorporated herein by reference.

REFERENCE SIGNS LIST 1 (1A, 1B, 1C, 1D) Terminal apparatus
3 (3A, 3B) Base station apparatus
10 Radio transmission and/or reception unit
11 Antenna unit
12 RF unit
13 Baseband unit
14 Coding and modulating unit 15 Decoding and demodulating unit
16 Higher layer processing unit
17 Medium access control layer processing unit
18 Radio resource control layer processing unit
30 Radio transmission and/or reception unit
31 Antenna unit
32 RF unit
33 Baseband unit
34 Coding and modulating unit
35 Decoding and demodulating unit
36 Higher layer processing unit
37 Medium access control layer processing unit
38 Radio resource control layer processing unit

The invention claimed is:

1. A terminal apparatus comprising:
a transmitter configured to transmit a time continuous signal for a first subcarrier in a first time symbol; and
a receiver configured to receive a Narrowband Physical Downlink Control Channel (NPDCCH) including downlink control information indicating a subcarrier index of the first subcarrier to which the time continuous signal corresponds, wherein
the transmitter is further configured to generate the time continuous signal based on at least a first complex-valued symbol to which a phase rotation is applied; wherein
the phase rotation is initialized for each transmission instance,
the phase rotation is given based on at least the subcarrier index of the first subcarrier,
the each transmission instance includes a plurality of time symbols, and
the each transmission instance includes repeat transmissions of Narrow Band Physical Uplink Shared Channels (NPUSCHs).

2. The terminal apparatus according to claim 1, wherein
a total number of the repeat transmissions in the each transmission instance is associated with a length of the each transmission instance.

3. A base station apparatus, comprising:
a receiver configured to receive a time continuous signal for a first subcarrier in a first time symbol from a terminal apparatus; and
a decoder configured to detect a first complex-valued symbol from the time continuous signal; wherein
the time continuous signal is generated, by the terminal apparatus, based on at least the first complex-valued symbol to which a phase rotation is applied,
the phase rotation is initialized for each transmission instance,
the phase rotation is given based on at least a subcarrier index of the first subcarrier,
the each transmission instance includes a plurality of time symbols, and
the each transmission instance includes repeat transmissions of Narrow Band Physical Uplink Shared Channels (NPUSCHs).

4. The base station apparatus according to claim 3, further comprising a transmitter configured to transmit a Narrowband Physical Downlink Control Channel (NPDCCH) including downlink control information indicating the subcarrier index of the first subcarrier to which the time continuous signal corresponds.

5. The base station apparatus according to claim 3, wherein
a total number of the repeat transmissions in the each transmission instance is associated with a length of the each transmission instance.

6. A communication method used for a terminal apparatus, the method comprising;
transmitting a time continuous signal for a first subcarrier in a first time symbol; and
generating the time continuous signal based on at least a first complex-valued symbol to which a phase rotation is applied, and
receiving a Narrowband Physical Downlink Control Channel (NPDCCH) including downlink control information indicating a subcarrier index of the first subcarrier to which the time continuous signal corresponds;
wherein the phase rotation is initialized for each transmission instance,
the phase rotation is given based on at least the subcarrier index of the first subcarrier
the each transmission instance includes a plurality of time symbols, and
the each transmission instance includes repeat transmissions of Narrow Band Physical Uplink Shared Channels (NPUSCHs).

7. A communication method used for a base station apparatus, the method comprising:
receiving a time continuous signal for a first subcarrier in a first time symbol from a terminal apparatus; and
detecting a first complex-valued symbol from the time continuous signal; wherein
the time continuous signal is generated, by the terminal apparatus, based on at least the first complex-valued symbol to which a phase rotation is applied,
the phase rotation is initialized for each transmission instance,
the phase rotation is given based on at least a subcarrier index of the first subcarrier,
the each transmission instance includes a plurality of time symbols, and
the each transmission instance includes repeat transmissions of Narrow Band Physical Uplink Shared Channels (NPUSCHs).

* * * * *